(12) United States Patent
Lee et al.

(10) Patent No.: US 8,184,107 B2
(45) Date of Patent: May 22, 2012

(54) LIQUID CRYSTAL DISPLAY AND METHOD OF DRIVING THE SAME

(75) Inventors: Min Kyung Lee, Kyungbuk (KR); Jun Hyeok Yu, Seoul (KR); Chang Keun Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 729 days.

(21) Appl. No.: 12/318,393

(22) Filed: Dec. 29, 2008

(65) Prior Publication Data

US 2009/0267917 A1    Oct. 29, 2009

(30) Foreign Application Priority Data

Apr. 25, 2008  (KR) .................. 10-2008-0039047

(51) Int. Cl.
*G06F 3/045*    (2006.01)

(52) U.S. Cl. ...................................... 345/174; 345/173

(58) Field of Classification Search .................. 345/156, 345/173–175, 177, 104; 178/18.01–18.07, 178/19.01–19.07
See application file for complete search history.

(56) References Cited

U.S. PATENT DOCUMENTS

| | | | | |
|---|---|---|---|---|
| 5,949,408 A | * | 9/1999 | Kang et al. | 345/169 |
| 2005/0275616 A1 | * | 12/2005 | Park et al. | 345/102 |
| 2006/0146038 A1 | * | 7/2006 | Park et al. | 345/173 |
| 2008/0143682 A1 | * | 6/2008 | Shim et al. | 345/173 |
| 2008/0158175 A1 | * | 7/2008 | Hotelling et al. | 345/173 |
| 2008/0158178 A1 | * | 7/2008 | Hotelling et al. | 345/173 |
| 2008/0180399 A1 | * | 7/2008 | Cheng | 345/173 |
| 2008/0263445 A1 | * | 10/2008 | Park | 715/702 |

FOREIGN PATENT DOCUMENTS

| | | |
|---|---|---|
| CN | 201004130 | 1/2008 |
| JP | 2003-099192 | 4/2003 |
| JP | 2006-023904 | 1/2006 |

* cited by examiner

*Primary Examiner* — Ricardo L Osorio
(74) *Attorney, Agent, or Firm* — Morgan, Lewis & Bockius LLP

(57) ABSTRACT

A liquid crystal display includes a transparent conductive layer on an first substrate of a liquid crystal display panel transmitting display light, an insulating layer on the transparent conductive layer, a sensing circuit to generate a touch or non-touch sensing signal based on changes in the amount of surface charge of the transparent conductive layer depending on whether or not the insulating layer is touched, and a driving voltage supply circuit to generate a driving voltage of a high potential for a light sensing operation of a touch sensor circuit only when the touch or non-touch sensing signal indicates that the insulating layer is touched.

16 Claims, 10 Drawing Sheets

When a liquid crystal display panel was not touched

When a liquid crystal display panel was touched

LIQUID CRYSTAL DISPLAY AND METHOD OF DRIVING THE SAME

This application claims the benefit of Korea Patent Application No. 10-2008-0039047 filed on Apr. 25, 2008, which is incorporated herein by reference for all purposes as if fully set forth herein.

BACKGROUND OF THE INVENTION

1. Field of the Invention

The present invention relates to an in-cell touch panel type liquid crystal display, and more specifically to a liquid crystal display and a method of driving the same capable of accurately sensing whether or not a liquid crystal display panel is touch and improving the reliability of a touch sensor circuit inside the liquid crystal display panel.

2. Discussion of the Related Art

A liquid crystal display (LCD) displays an image by controlling light transmitted through a liquid crystal layer using an electric field generated in response to a video signal and applied to the liquid crystal layer. Because the liquid crystal display is a thin, small-sized flat panel display device with low power consumption, the liquid crystal display has been used in personal computers such as notebook PCs, office automation equipment, audio/video equipment, and the like. In particular, because an active matrix type liquid crystal display includes a switching element in each liquid crystal cell that is actively controlled, the active matrix type liquid crystal display is advantageous in displaying a moving picture. A thin film transistor (TFT) has been mainly used as the switching element of the active matrix type liquid crystal display.

In general, an active matrix type liquid crystal display converts digital video data into an analog data voltage based on a gamma reference voltage. As shown in FIG. 1, the analog data voltage is then applied to a data line DL while a scan pulse is applied to a gate line GL. The scan pulse activates a thin film transistor TFT connected thereto, thereby charging a liquid crystal cell Clc with the data voltage on the data line DL. The thin film transistor TFT includes a gate electrode connected to the gate line GL, a source connected to the data line DL, and a drain electrode commonly connected to a pixel electrode of the liquid crystal cell Clc and one electrode of a storage capacitor Cst. A common voltage Vcom is applied to a common electrode of the liquid crystal cell Clc. When the scan pulse is applied to the gate line GL, the thin film transistor TFT is turned on, and a channel is formed between the source and drain electrodes of the thin film transistor TFT. Hence, a voltage on the data line DL is supplied to the pixel electrode of the liquid crystal cell Clc. Additionally, when the thin film transistor TFT is turned on, the storage capacitor Cst is charged with the data voltage applied through the data line DL, thereby keeping the voltage level of the liquid crystal cell Clc constant. The orientation of liquid crystal molecules in the liquid crystal cell Clc changes due to an electric field generated between the pixel electrode and the common electrode, thereby changing the incident light. Because the liquid crystal display is generally a light receiving element (i.e., liquid crystals do not generate light), the liquid crystal display adjusts luminance of the screen using light produced by a backlight unit formed in the rear of a liquid crystal display panel.

Recently, a touch screen panel attached to the liquid crystal display has been proposed. The touch screen panel generally attached on the liquid crystal display is a user interface that detects changes in electrical characteristics at a touch position where an opaque object, such as a finger or a pen, contacts the touch screen panel. When a user's finger or a touch pen contacts the screen of the touch screen panel of the liquid crystal display, a display device detects the information of the touch position and uses the information for various applications.

However, the touch screen panel of the liquid crystal display generally increases the manufacturing cost of the liquid crystal display, may reduce the manufacturing yield due to the added process of attaching the touch screen panel to the liquid crystal display, may reduce brightness of the liquid crystal display, increases the thickness of the liquid crystal display, and the like.

To solve the above-described problems, rather than attaching a touch screen panel, an in-cell touch panel type liquid crystal display has been proposed. An in-cell touch panel type liquid crystal display includes a touch sensor circuit including a sensor thin film transistor (TFT) formed inside the liquid crystal cell Clc of the liquid crystal display. As shown in FIG. 2, the touch sensor circuit includes a sensor TFT that changes a light current "i" depending on changes in the amount of external light coming into the panel, a sensor capacitor Cst2 that stores a charge generated by the light current "i," and a switching TFT that switches on and off an output of the charge stored in the sensor capacitor Cst2. A bias voltage Vbias is supplied to a gate electrode of the sensor TFT and is set at a voltage level equal to or smaller than a threshold voltage of the gate electrode of the sensor TFT.

In the touch sensor circuit shown in FIG. 2, the light current (i) of a sensor TFT in a touch area is larger than the light current of a sensor TFT in a non-touch area when the outside environment is darker than the backlight (e.g., indoors). On the other hand, the light current (i) of a sensor TFT in a touch area is smaller than the light current of a sensor TFT in a non-touch area when the outside environment is brighter than the backlight (e.g., outdoors). In either circumstance, a light sensing signal produced in the touch area is different than a light sensing signal in the non-touch area. Accordingly, the liquid crystal display detects the touch position information based on the light sensing signals of the touch sensor circuit. However, the in-cell touch panel type liquid crystal display has the following drawbacks.

Because the related art in-cell touch panel type liquid crystal display detects the touch position based on only a relative difference between the light currents flowing in the sensor TFTs, detection of whether or not the liquid crystal display panel is actually touched cannot be determined accurately. For example, FIG. 3A shows that if external light produces a shadow from the user's fingers in a strong illuminance environment (e.g., outdoor environment) without touching the liquid crystal display, the related art in-cell touch panel type liquid crystal display may not be able distinguish from an actual touch condition shown in FIG. 3B.

Further, because the sensor TFT needs to continuously receive a DC driving voltage Vdrv with a high potential through the gate electrode of the sensor TFT for the above-described light sensing operation, the sensor TFT may be degraded when the sensor TFT is driven for a long period of time. Because the degradation of the sensor TFT reduces the output characteristics of the touch sensor circuit to cause an error of the output light sensing signal, the reliability of the touch sensor circuit is reduced. In other words, if the sensor TFT is degraded, the touch sensor circuit may fail to output a sensing signal indicating that the liquid crystal display panel has been touched even if the user touches the liquid crystal display panel with his finger. Conversely, the touch sensor circuit may output a sensing signal indicating the liquid crystal display panel has been touched even if the user does not touch the liquid crystal display panel with his finger.

SUMMARY OF THE INVENTION

Accordingly, the present invention is directed to a liquid crystal display and a method of driving the same that substantially obviates one or more problems due to limitations and disadvantages of the related art.

An object of the present invention is to provide a liquid crystal display and a method of driving the same with improved accuracy and reliability of a touch sensor circuit inside the liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a transparent conductive layer on an first substrate of a liquid crystal display panel transmitting display light, an insulating layer on the transparent conductive layer, a sensing circuit to generate a touch or non-touch sensing signal based on changes in the amount of surface charge of the transparent conductive layer depending on whether or not the insulating layer is touched, and a driving voltage supply circuit to generate a driving voltage of a high potential for a light sensing operation of a touch sensor circuit only when the touch or non-touch sensing signal indicates that the insulating layer is touched.

In another aspect, a method of driving a liquid crystal display including a transparent conductive layer on a first substrate of the liquid crystal display panel transmitting display light and an insulating layer on the transparent conductive layer, the method includes generating a touch or non-touch sensing signal based on an amount of surface charge of the transparent conductive layer depending on whether or not the polarizing plate is touched, and generating a driving voltage of a high potential for a light sensing operation of a touch sensor circuit only when the touch or non-touch sensing signal indicates that the insulating layer is touched.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
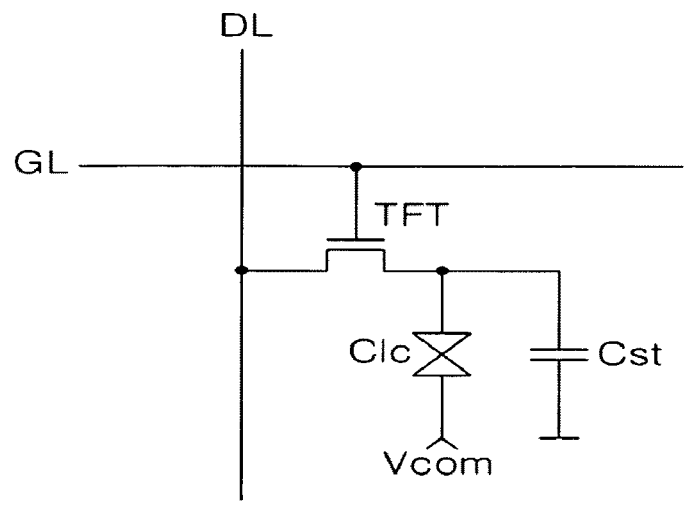
FIG. 1 is an equivalent circuit diagram of an active matrix type liquid crystal display.
Figure 2:
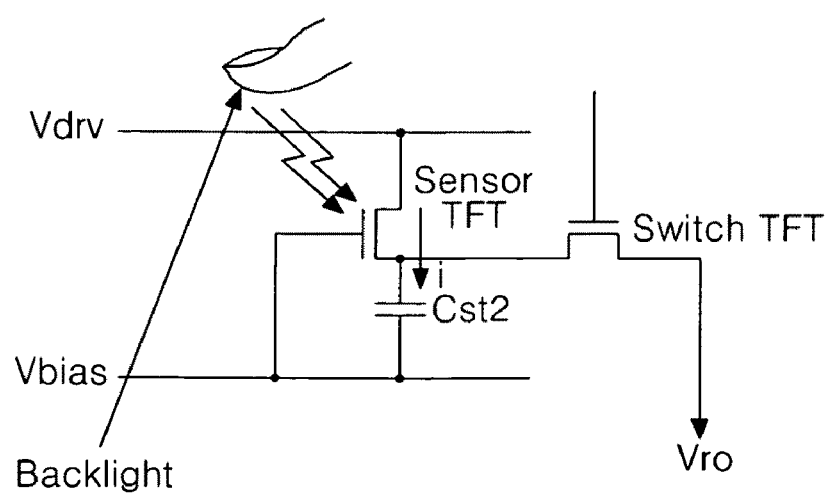
FIG. 2 is a diagram for explaining an operation of a touch sensor circuit.
Figure 3A:
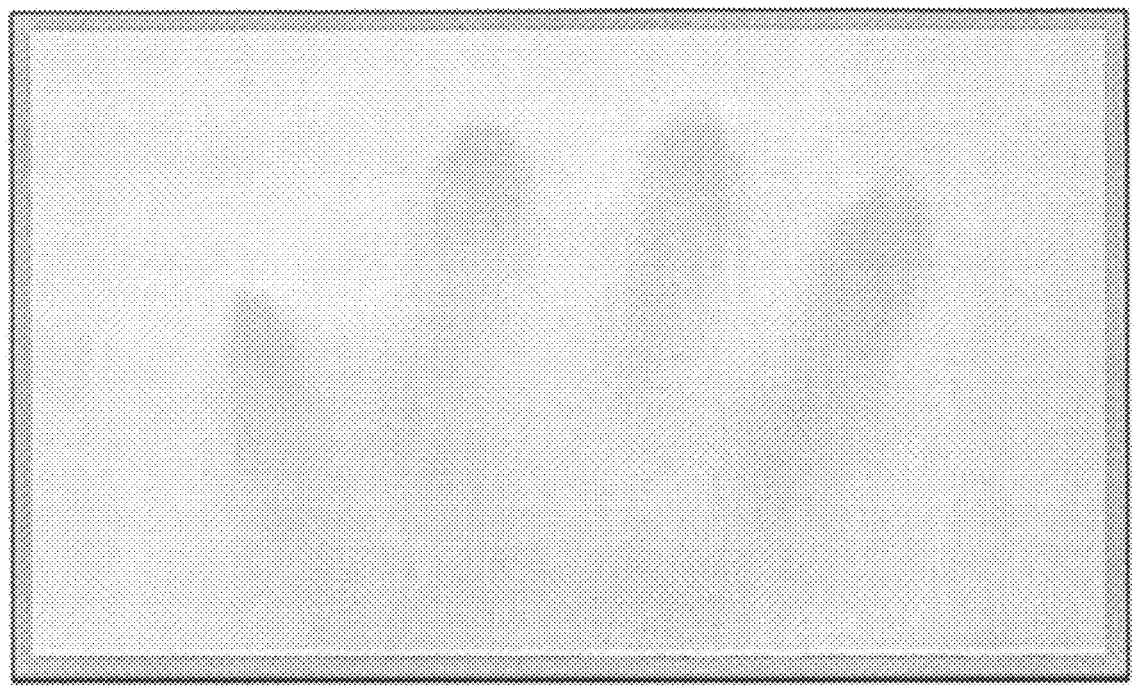
FIGS. 3A and 3B are diagrams showing when a liquid crystal display panel was not touched and was touched, respectively.
Figure 3B:
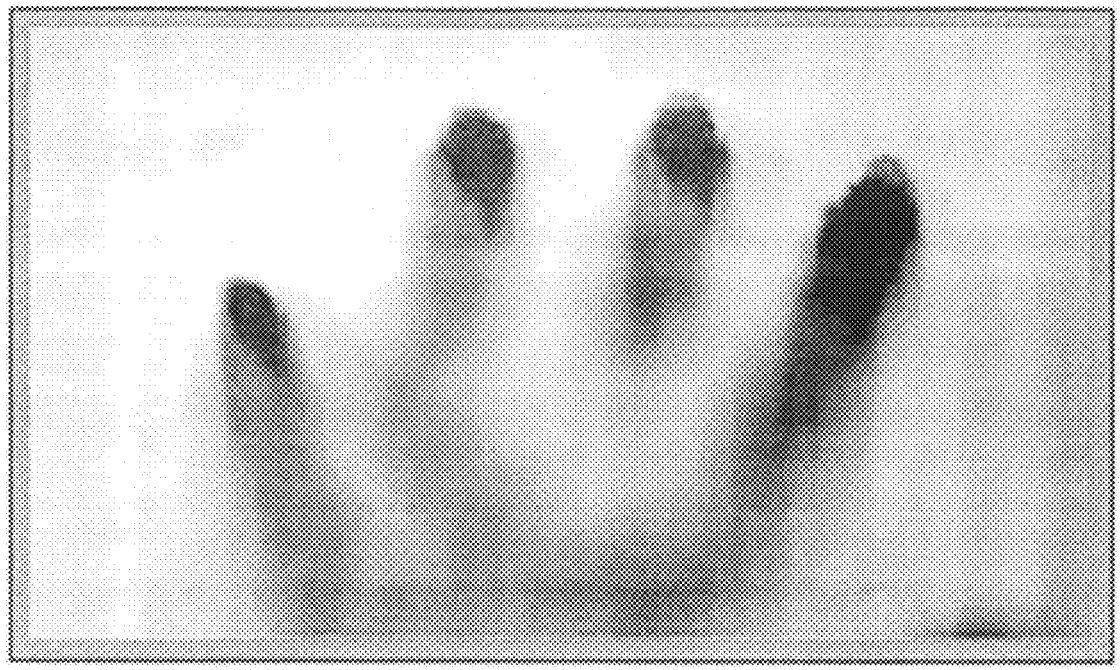
Figure 4:
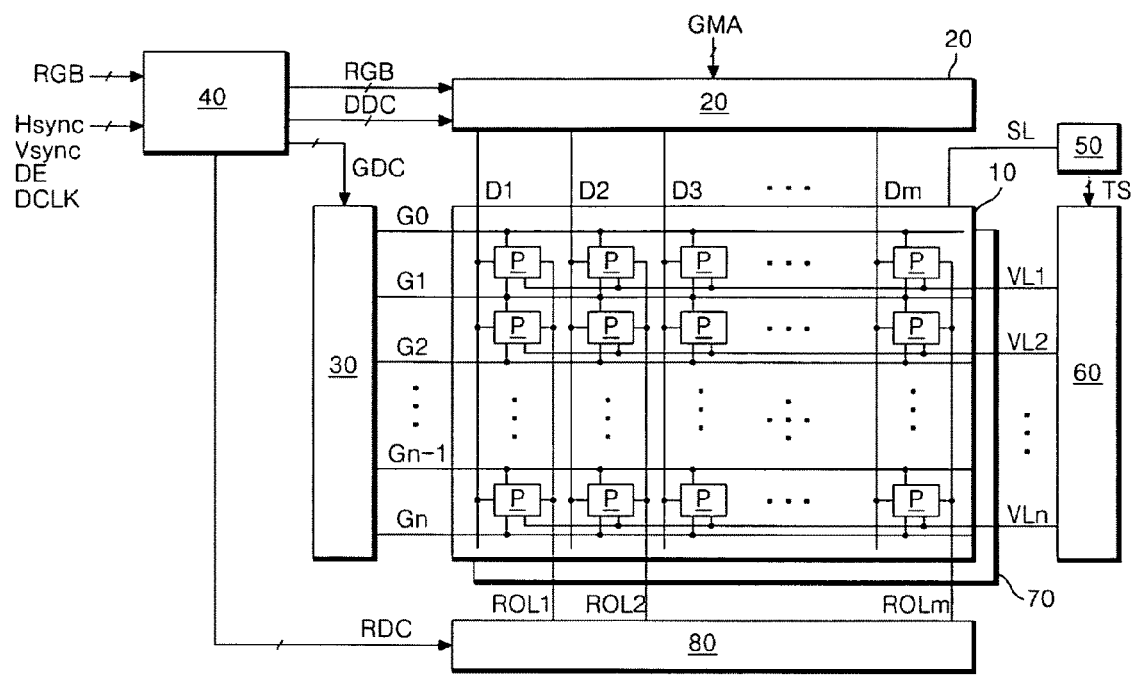
FIG. 4 is a block diagram of a liquid crystal display according to an exemplary embodiment of the invention.

FIG. 4 is a block diagram of a liquid crystal display according to an exemplary embodiment of the invention. As shown in FIG. 4, the liquid crystal display according to the exemplary embodiment of the invention includes a liquid crystal display panel 10, a data drive circuit 20, a gate drive circuit 30, a timing controller 40, a sensing circuit 50, a driving voltage supply circuit 60, a backlight unit 70, and a readout integrated circuit (IC) 80. The liquid crystal display panel 10 includes a plurality of gate lines G0 to Gn, a plurality of data lines D1 to Dm, a plurality of driving voltage supply lines VL1 to VLn, and a pixel P having a touch sensor circuit at each crossing of the lines G0 to Gn, D1 to Dm, and VL1 to VLn.

The data drive circuit 20 supplies a data voltage to the data lines D1 to Dm, and the gate drive circuit 30 supplies a scan pulse to the gate lines G0 to Gn. The timing controller 40 controls drive timing of the data drive circuit 20 and the gate drive circuit 30. The sensing circuit 50 senses whether or not a user touches the liquid crystal display panel 10 with his or her finger and generates a touch/non-touch sensing signal TS. The driving voltage supply circuit 60 changes the level of a driving voltage required to drive the touch sensor circuit inside the pixel P depending on the touch/non-touch sensing signal TS and supplies the changed driving voltages to the driving voltage supply lines VL1 to VLn. The backlight unit 70 is positioned in the rear of the liquid crystal display panel 10 and produces light. The readout IC 80 is commonly connected to readout lines ROL1 to ROLm of the liquid crystal display panel 10.

Figure 8:
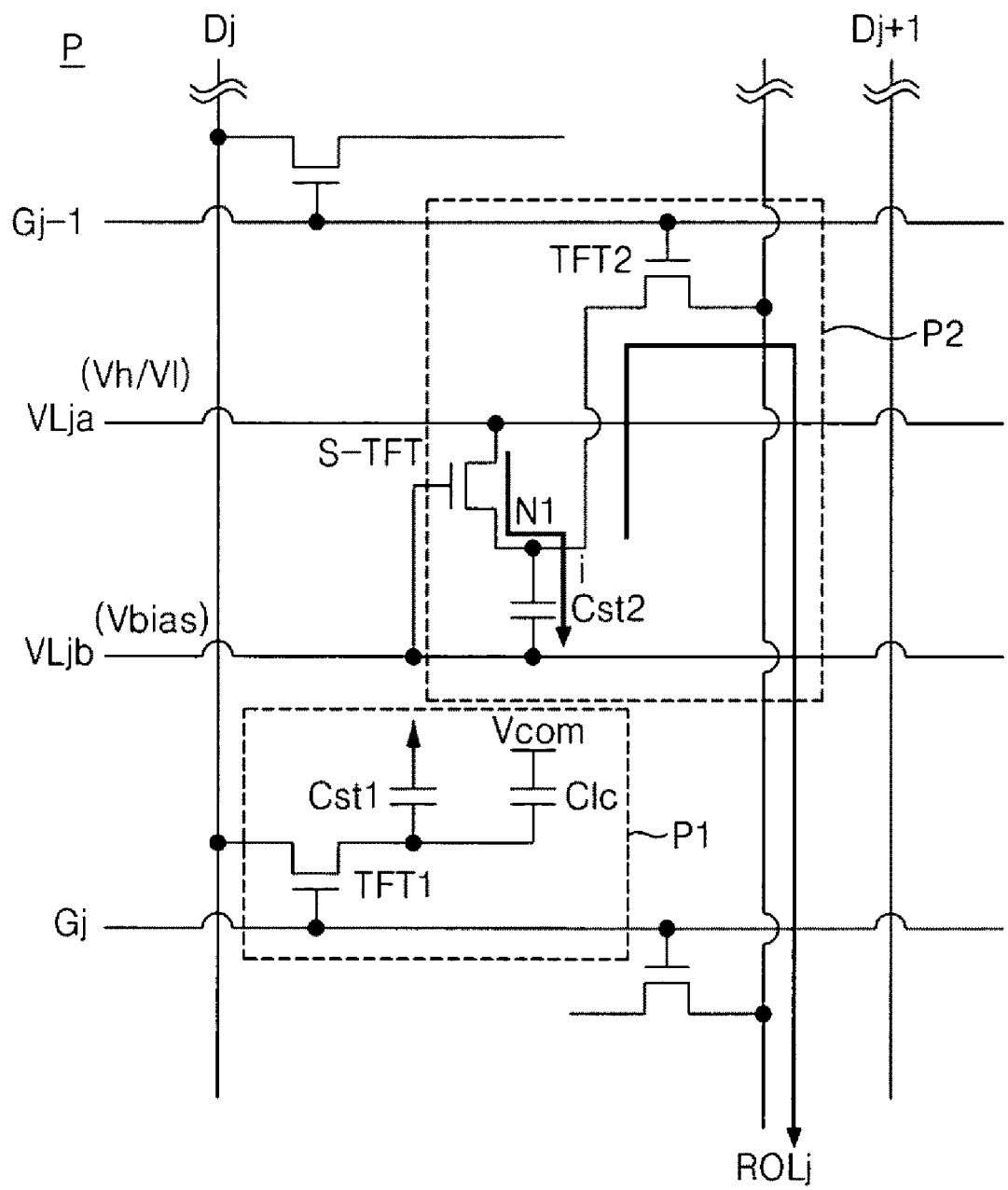
FIG. 8 is an equivalent circuit diagram of a pixel in accordance with an exemplary embodiment of the present invention.

The liquid crystal display panel 10 includes an upper substrate including a color filter, a lower substrate on which a pixel circuit and the pixels P are formed, and a liquid crystal layer interposed between the upper substrate and the lower substrate. The data lines D1 to Dm cross the gate lines G0 to Gn on the lower substrate of the liquid crystal display panel 10. The driving voltage supply lines VL1 to VLn are parallel to the gate lines G0 to Gn and formed on the lower substrate of the liquid crystal display panel 10. The readout lines ROL1 to ROLm are perpendicular to the gate lines G0 to Gn. As shown in FIG. 8, a pixel circuit P1 is formed at each region where the data lines D1 to Dm and the gate lines G0 to Gn cross, and a touch sensor circuit P2 is formed in a region where the driving voltage supply lines VL1 to VLn and the readout lines ROL1 to ROLm cross. The driving voltage supply lines VL1 to VLn each include first supply lines VL1a to VLna for supplying a driving voltage to the touch sensor circuit P2 and second supply lines VL1b to VLnb for supplying a bias voltage to the touch sensor circuit P2. The touch sensor circuit P2 generates the touch/non-touch sensing signal TS depending on the touch or non-touch operation and supplies the touch/non-touch sensing signal TS to the readout IC 80 through the readout lines ROL1 to ROLm.

A black matrix is formed on the upper substrate of the liquid crystal display panel 10 to cover an interface between the pixels P. A common electrode and a pixel electrode are on opposite sides of the liquid crystal layer. The common electrode receiving a common voltage is formed on the upper substrate of the liquid crystal display panel 10 in a vertical electric mode such as a twisted nematic (TN) mode and a vertical alignment (VA) mode. In a transverse electric mode such as an in-plane switching (IPS) mode and a fringe field switching (FFS) mode, the common electrode is formed on the lower substrate of the liquid crystal display panel 10.

The data drive circuit 20 converts digital video data RGB into an analog gamma compensation voltage based on a gamma reference voltage generated by a gamma reference voltage generation unit (not shown) in response to a data control signal DDC produced by the timing controller 40. The analog gamma compensation voltage serving as a data voltage is supplied to the liquid crystal display panel 10. The gate drive circuit 30 generates scan pulses in response to a gate control signal GDC produced by the timing controller 40 and sequentially supplies the scan pulses to the gate lines G1 to Gn to select horizontal lines of the liquid crystal display panel 10 to which the data voltage is supplied.

The timing controller 40 rearranges the digital video data RGB received from a system (not shown) in conformity with the liquid crystal display panel 10 and supplies the digital video data RGB to the liquid crystal display panel 10. The timing controller 40 produces the data control signal DDC for controlling the data drive circuit 20, the gate control signal GDC for controlling the gate drive circuit 30, and a readout control signal RDC for controlling the readout IC 80 using timing control signals Vsync, Hsync, DCLK, and DE received from the system.

The backlight unit 70 is positioned in the rear of the liquid crystal display panel 10 and includes a plurality of lamps installed to overlap the liquid crystal display panel 10. The lamp of the backlight unit 70 may include a cold cathode fluorescent lamp (CCFL), an external electrode fluorescent lamp (EEFL), and a heat cathode fluorescent lamp (HCFL). The lamps provide light at the rear of the liquid crystal display panel 10 and driven by an inverter (not shown). The backlight unit 70 may include a plurality of light emitting diodes instead of the lamps or may include both the lamps and the light emitting diodes.

Figure 5:
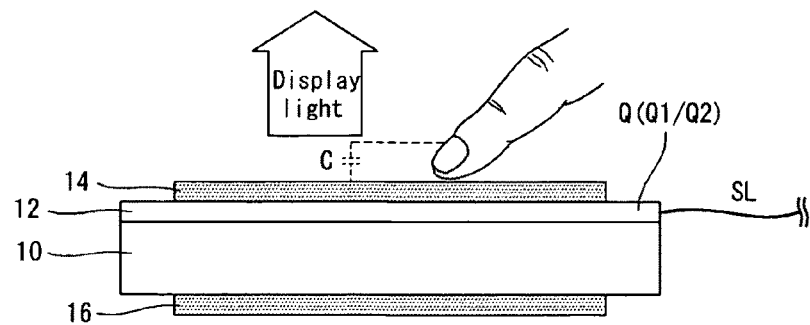
FIG. 5 shows an exemplary structure of a touch sensitive liquid crystal display in accordance with the present invention.

As shown in FIG. 5, polarizing plates 14 and 16 for selecting linear polarization are formed on the upper and lower substrates of the liquid crystal display panel 10, respectively. A transparent conductive layer 12 formed of a material such as indium-tin-oxide (ITO) and indium-zinc-oxide (IZO) is formed between the upper polarizing plate 14 transmitting display light and the upper substrate of the liquid crystal display panel 10. When the user touches the upper polarizing plate 14 with his/her finger, for example, the user's finger and the transparent conductive layer 12 serve as electrodes and the upper polarizing plate 14 serves as a dielectric of an equivalent capacitor C. Hence, the amount of the surface charge Q of the transparent conductive layer 12 when the upper polarizing plate 14 is touched (Q1) is different than when the upper polarizing plate 14 is not touched (Q2) due to the capacitive effect of the equivalent capacitor C formed by the user's finger serving as a conductor. The changes in the amount of surface charge Q during the touch and non-touch operations is supplied to the sensing circuit 50 through a sensing line SL to detect whether or not the liquid crystal display panel 10 is touched.

Figure 6:
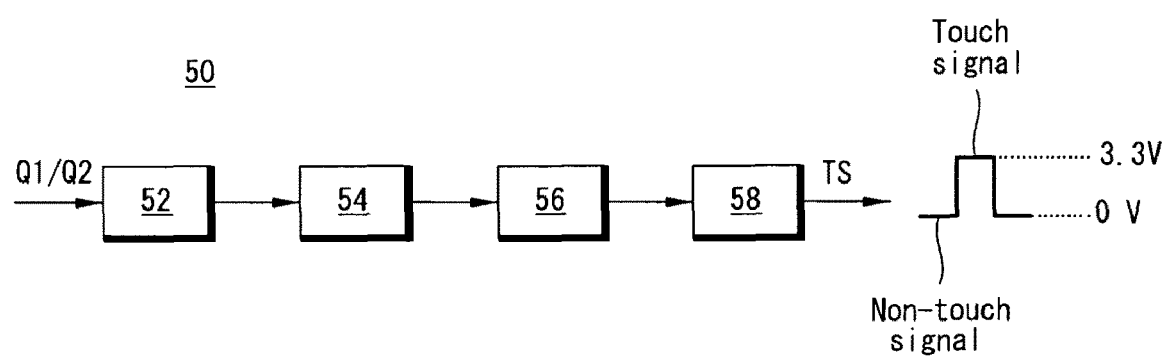
FIG. 6 shows an exemplary configuration of a sensing circuit.

FIG. 6 illustrates an exemplary sensing circuit 50 that includes a charge amount sensing unit 52, a QV converting unit 54, an AD converting unit 56, and a touch or non-touch sensing signal generation unit 58. The charge amount sensing unit 52 is connected to the sensing line SL and senses the amount of surface charge Q of the transparent conductive layer 12 between the upper polarizing plate 14 and the upper substrate of the liquid crystal display panel 10. As described above, the amount of surface charge Q of the transparent conductive layer 12 has a different value during the touch and non-touch operations. For example, the amount of surface charge Q of the transparent conductive layer 12 during the touch operation has a first charge amount Q1, and the amount of surface charge Q of the transparent conductive layer 12 during the non-touch operation has a second charge amount Q2.

The QV converting unit 54 converts the amount of surface charge Q (i.e., first charge amount Q1 or the second charge amount Q2) received from the charge amount sensing unit 52 into an analog voltage value. The AD converting unit 56 converts the analog voltage value received from the QV converting unit 54 into a digital voltage value.

The touch or non-touch sensing signal generation unit 58 produces the touch/non-touch sensing signal TS based on the digital voltage value received from the AD converting unit 56. The touch/non-touch sensing signal TS is generated as a touch signal when the digital voltage value of the first charge amount Q1 is present, and the touch/non-touch sensing signal TS is generated as a non-touch signal when the digital voltage value of the second charge amount Q2 is present. The touch/non-touch sensing signal TS is a transistor-to-transistor logic (TTL) signal swing between 0 V and 3.3 V.

Figure 7:
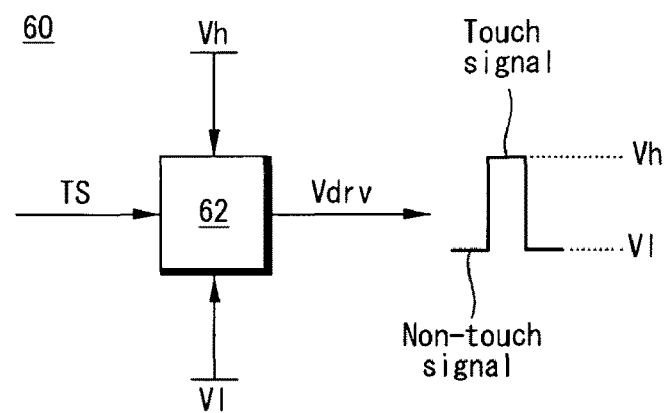
FIG. 7 shows an exemplary configuration of a driving voltage supply circuit.

FIG. 7 illustrates an exemplary driving voltage supply circuit 60 that includes a level shifter 62. The level shifter 62 level-shifts the TTL level of the touch/non-touch sensing signal TS into a driving voltage level sufficient to drive the touch sensor circuit P2 inside the pixel P (FIG. 8). As a result of the level shifting operation, the driving voltage supply circuit 60 generates a driving voltage Vdrv swing between a high potential Vh and a low potential Vl to supply the driving voltage Vdrv to the first supply lines VL1a to VLna of the driving voltage supply lines VL1 to VLn. The touch sensor circuit P2 performs a light sensing operation when the driving voltage Vdrv of the high potential Vh is generated in response to the touch signal. The touch sensor circuit P2 stops the light sensing operation when the driving voltage Vdrv of the low potential Vl is generated in response to the non-touch signal. Although it is not shown, the driving voltage supply circuit 60 generates a bias voltage to supply the bias voltage to the second supply lines VL1b to VLnb of the driving voltage supply lines VL1 to VLn.

The readout IC 80 includes a plurality of circuits respectively connected to the readout lines ROL1 to ROLm of the liquid crystal display panel 10. The readout IC 80 converts a light sensing signal received from the readout lines ROL1 to ROLm into a digital signal to be supplied to the system. The system performs a touch recognition process and a coordinate calculation process through a touch algorithm, and indicates the area of touch on the liquid crystal display panel 10.

FIG. 8 illustrates an equivalent circuit diagram of the pixel P briefly described above. As shown in FIG. 8, the pixel P includes a pixel circuit P1 at a crossing region of the j-th gate line Gj and the j-th data line Dj, and a touch sensor circuit P2 at a crossing region of the j-th first supply line VLja, the j-th second supply line VLjb, and the j-th readout line ROLj. The pixel circuit P1 includes liquid crystal cells Clc, a pixel thin film transistor (TFT) TFT1 for driving the liquid crystal cells Clc at a crossing region of the j-th gate line Gj and the j-th data line Dj, and a storage capacitor Cst1 that keeps a charging voltage of the liquid crystal cells Clc constant during one frame.

The pixel TFT TFT1 supplies the data voltage supplied through the j-th data line Dj to the pixel electrode of the liquid crystal cell Clc in response to the scan pulse received through the j-th gate line Gj. For this, the pixel TFT TFT1 includes a gate electrode connected to the j-th gate line Gj, a source electrode connected to the j-th data line Dj, and a drain electrode connected to the pixel electrode of the liquid crystal cell Clc. The liquid crystal cell Clc is charged with a voltage magnitude corresponding to a difference between the data voltage and the common voltage Vcom. The arrangement of liquid crystal molecules changes by an electric field formed by the voltage magnitude, and thus the amount of transmitted light may be controlled.

The touch sensor circuit P2 includes a sensor TFT S-TFT, a sensor capacitor Cst2, and a switch TFT TFT2. The sensor TFT S-TFT generates a light current "i" when the driving voltage Vdrv has a high potential Vh and does not generate the light current "i" when the driving voltage Vdrv has a low potential V1. The sensor capacitor Cst2 stores charges generated by the light current "i." The switch TFT TFT2 switches the charges stored in the sensor capacitor Cst2 to the readout line ROLj.

The sensor TFT S-TFT includes a gate electrode connected to the second supply line VLjb, a source electrode connected to the first supply line VLja, and a drain electrode connected to a first node N1. A bias voltage Vbias set at a voltage equal to or smaller than a threshold voltage of the gate electrode of the sensor TFT S-TFT is supplied to the gate electrode of the sensor TFT S-TFT. The driving voltage Vdrv swing between the high potential Vh and the low potential V1 is supplied to the source electrode of the sensor TFT S-TFT depending on whether or not the upper polarizing plate 14 is touched. The sensor TFT S-TFT performs a light sensing operation during when the driving voltage Vdrv is maintained at the high potential Vh in response to the touch operation. On the other hand, the sensor TFT S-TFT stops the light sensing operation during when the driving voltage Vdrv is maintained at the low potential V1 in response to the non-touch operation. Accordingly, degradation of the sensor TFT S-TFT that may be caused by continuous light sensing operation is avoided.

The sensor TFT S-TFT is not covered by the black matrix of the upper substrate unlike the pixel TFT TFT1 and the switch TFT2. Therefore, the sensor TFT S-TFT generates the light current "i" in response to the light coming from the outside when the driving voltage Vdrv is maintained at the high potential Vh. Furthermore, the amount of light current "i" generated by the sensor TFT S-TFT depends on whether or not the sensor TFT S-TFT corresponds to a touch position. For example, in an environment that is darker than the backlight (e.g., indoor), the sensor TFT S-TFT in a touch position generates a larger light current "i" than the sensor TFT S-TFT in a non-touch position. On the other hand, in an environment that is brighter than the backlight (e.g., outdoors), the sensor TFT S-TFT in a touch position generates a smaller light current "i" than the sensor TFT S-TFT in a non-touch position.

The sensor capacitor Cst2 connected between the first node N1 and the second supply line VLjb stores the charges generated by the light current "i." A voltage VN1 at the first node N1 gradually increases by the charges stored in the sensor capacitor Cst2 until the switch TFT TFT2 is turned on. The voltage VN1 at the first node N1 changes depending on whether or not the sensor TFT S-TFT is in a touch position when the driving voltage Vdrv is at the high potential Vh. For example, in an environment that is darker than the backlight (e.g., indoors), the voltage VN1 at the first node N1 is higher when the sensor TFT S-TFT is in a touch position than when the sensor TFT S-TFT is in a non-touch position. On the other hand, in an environment that is brighter than the backlight (e.g., outdoors), the voltage VN1 at the first node N1 lower when the sensor TFT S-TFT is in the touch position than when the sensor TFT S-TFT is not in the touch position. The voltage VN1 at the first node N1 is held at an initial value during when the driving voltage Vdrv is maintained at the low potential V1.

The switch TFT TFT2 includes a gate electrode connected to the (j-1)-th gate line Gj-1, a source electrode connected to the first node N1, and a drain electrode connected to the j-th readout line ROLj. The switch TFT TFT2 is turned on in response to the scan pulse SPj-1 supplied to the (j-1)-th gate line Gj-1 and thus outputs the voltage VN1 at the first node N1 as a light sensing signal to the j-th readout line ROLj.

As described above, the liquid crystal display according to the exemplary embodiment of the invention uses the amount of surface charge Q of the transparent conductive layer 12 to accurately detect whether or not the user touches the upper polarizing plate 14. Only when the user touches the liquid crystal display, the driving voltage Vdrv is applied to the touch sensor circuit P2 to detect the location of the touch position, thereby improving the life span and reliability of the touch sensor circuit P2.

Figure 9:
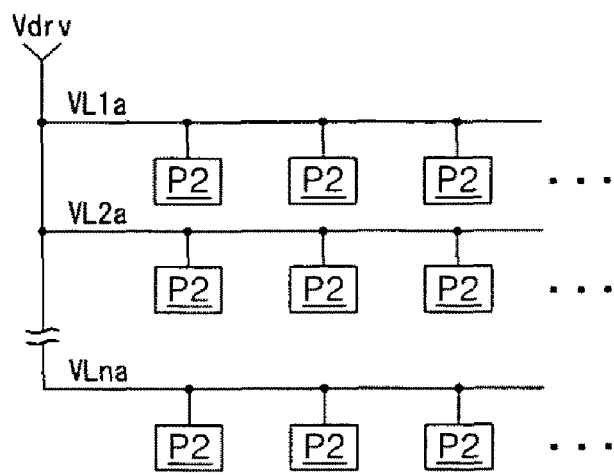
FIG. 9 illustrates a first exemplary connection structure between touch sensor circuits.
Figure 10:
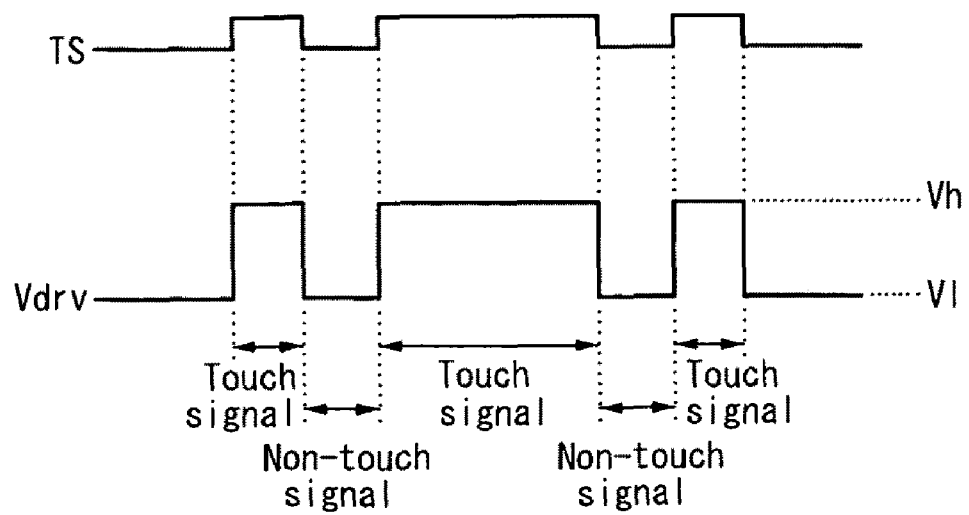
FIG. 10 is an exemplary waveform diagram of a driving voltage applied to the touch sensor circuits of FIG. 9.

FIG. 9 illustrates a first exemplary connection structure between the touch sensor circuits P2. FIG. 10 is an exemplary waveform diagram of the driving voltage Vdrv applied to the touch sensor circuits P2 of FIG. 9.

As shown in FIGS. 9 and 10, the touch sensor circuits P2 formed in each pixel line are commonly connected to each of the first supply lines VL1a to VLna. Further, the first supply lines VL1a to VLna are commonly connected to receive the driving voltage Vdrv generated by the driving voltage supply circuit 60. In the present embodiment, the driving voltage Vdrv is at a high potential Vh during the on-time of the touch/non-touch sensing signal TS, and the driving voltage Vdrv is at a low potential V1 during the off-time of the touch/non-touch sensing signal TS. The driving voltage Vdrv is at the high potential Vh during only the on-time of the touch/non-touch sensing signal TS. Therefore, the touch sensor circuits P2 are intermittently driven based on the driving voltage Vdrv of the high potential Vh. Accordingly, the degradation of the sensor TFTs S-TFT inside the touch sensor circuits P2 can be greatly reduced as compared with the related art.

Figure 11:
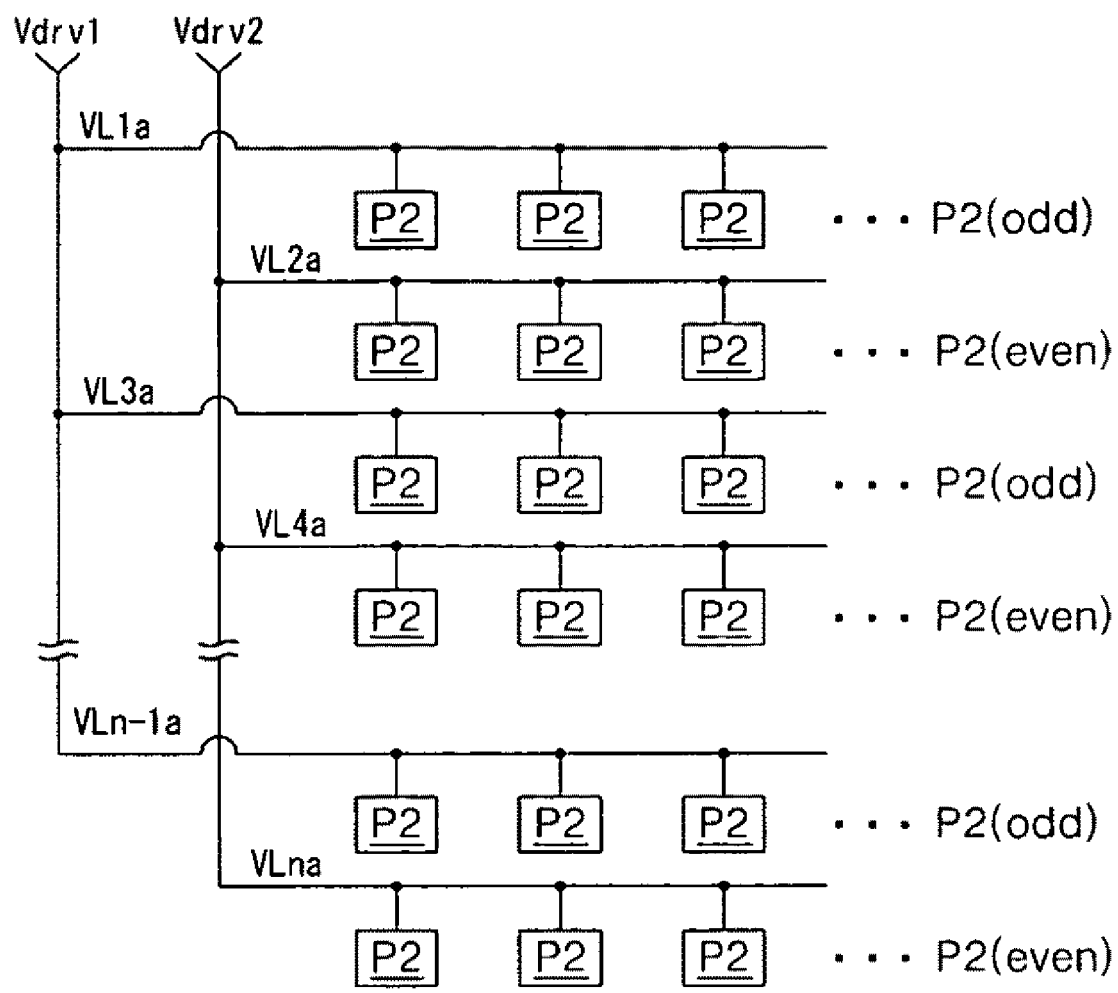
FIG. 11 illustrates a second exemplary connection structure between touch sensor circuits.
Figure 12:
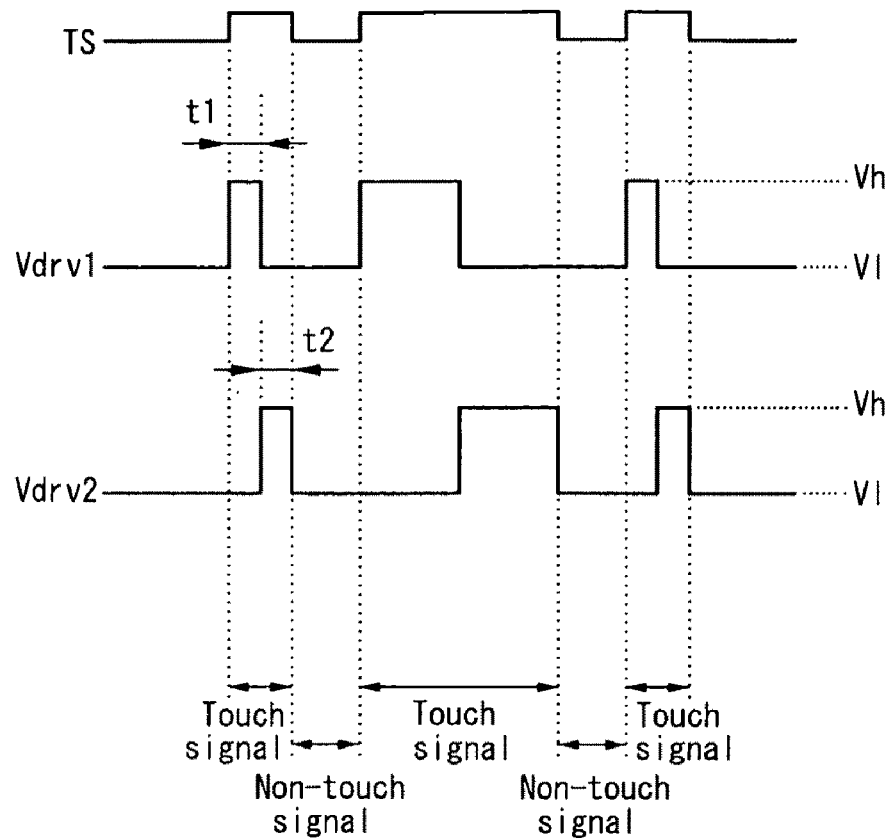
FIG. 12 is an exemplary waveform diagram of driving voltages applied to the touch sensor circuits of FIG. 11.

FIG. 11 illustrates a second exemplary connection structure between the touch sensor circuits P2. FIG. 12 is an exemplary waveform diagram of driving voltages Vdrv1 and Vdrv2 applied to the touch sensor circuits P2 of FIG. 11.

As shown in FIGS. 11 and 12, the touch sensor circuits P2 on each odd-numbered pixel line are commonly connected to each corresponding odd-numbered first supply lines VL1a, VL3a, ..., VLn-1a. Further, the odd-numbered first supply lines VL1a,VL3a, ..., VLn-1a are commonly connected to receive a first driving voltage Vdrv1 generated by the driving voltage supply circuit 60. The touch sensor circuits P2 on each even-numbered pixel line are commonly connected to each corresponding even-numbered first supply lines VL2a, VL4a, ..., VLna. Further, the even-numbered first supply lines VL2a,VL4a, ..., VLna are commonly connected to receive a second driving voltage Vdrv2 generated by the driving voltage supply circuit 60.

In the present exemplary embodiment, the first driving voltage Vdrv1 is at a high potential Vh during a first half period t1 of the on-time of the touch/non-touch sensing signal TS, and the first driving voltage Vdrv1 is at a low potential V1 during a second half period t2 of the on-time of the touch/non-touch sensing signal TS. The first driving voltage Vdrv1 is at the low potential V1 during the off-time of the touch/non-touch sensing signal TS. On the other hand, the second driving voltage Vdrv2 is at a low potential V1 during the first half period t1 of the on-time of the touch/non-touch sensing signal TS, the second driving voltage Vdrv2 is at a high potential Vh during the second half period t2 of the on-time of the touch/non-touch sensing signal TS. The second driving voltage Vdrv2 is at the low potential V1 during the off-time of the touch/non-touch sensing signal TS.

The odd touch sensor circuits P2 (odd) perform the light sensing operation in response to the first driving voltage Vdrv1 of the high potential Vh, and stop the light sensing operation in response to the first driving voltage Vdrv1 of the low potential V1. The even touch sensor circuits P2 (even) perform the light sensing operation in response to the second driving voltage Vdrv2 of the high potential Vh, and stop the light sensing operation in response to the second driving voltage Vdrv2 of the low potential V1. As a result, in the present exemplary embodiment, the first driving voltage Vdrv1 is at the high potential Vh during the first half period t1 of the on-time of the touch/non-touch sensing signal TS, and the second driving voltage Vdrv2 is at the high potential Vh during the second half period t2 of the on-time of the touch/non-touch sensing signal TS. Therefore, the touch sensor circuits P2 (odd) on the odd-numbered pixel lines and the touch sensor circuits P2 (even) on the even-numbered pixel lines are alternately driven only when the first and second driving voltages Vdrv1 and Vdrv2 are at the high potential Vh. Accordingly, the degradation of the sensor TFTs S-TFT inside the touch sensor circuits P2 can be greatly reduced as compared with the related art.

Figure 13:
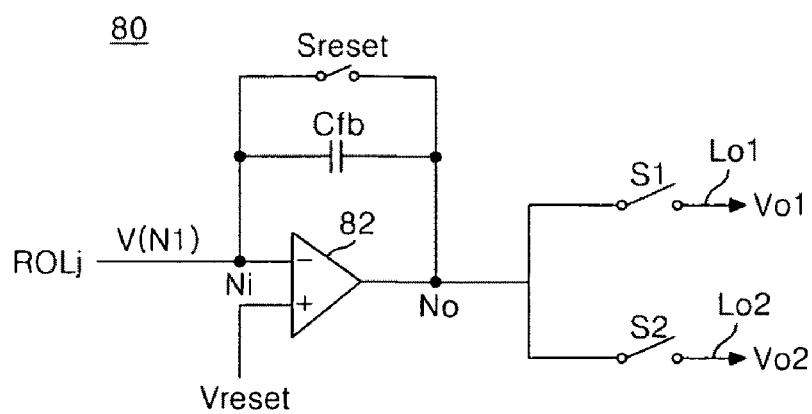
FIG. 13 is a partial equivalent circuit diagram of an exemplary readout integrated circuit (IC)
Figure 14:
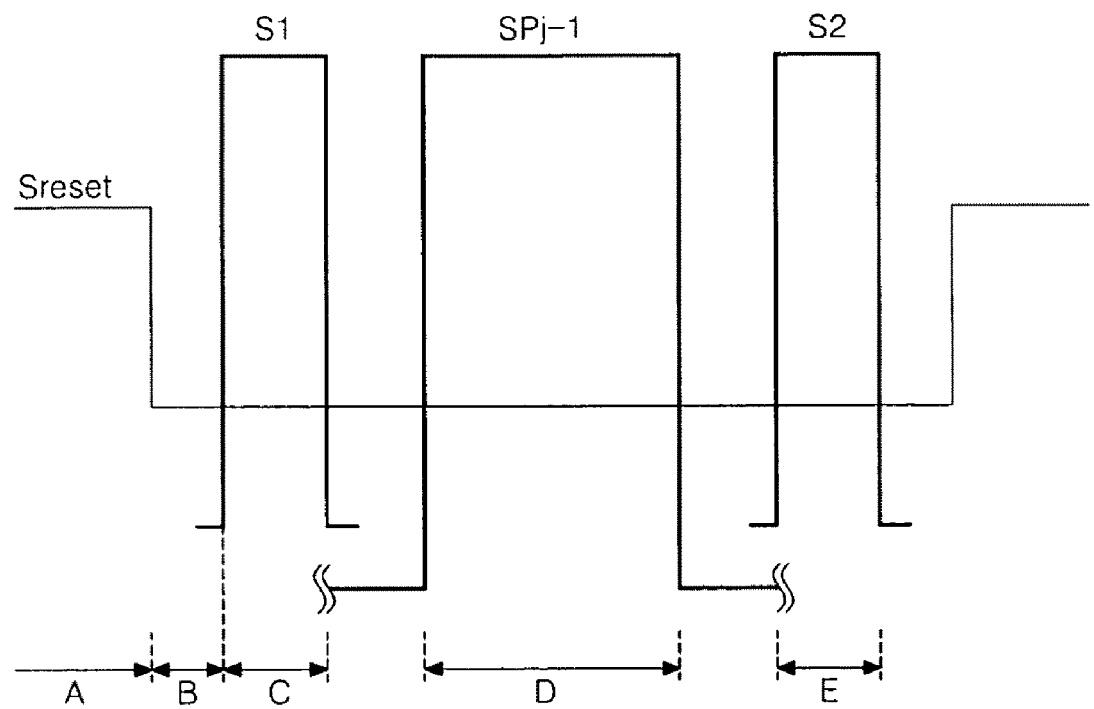
FIG. 14 is an exemplary waveform diagram for explaining an operation of the readout IC shown in FIG. 13.

FIG. 13 is a partial equivalent circuit diagram of an exemplary embodiment of the readout IC 80. FIG. 14 is an exemplary waveform diagram for explaining an operation of the readout IC 80. In FIG. 4, reference labels Sreset, S1, and S2 are some of the readout control signals RDC produced by the timing controller 40 (FIG. 4), and reference label SPj-1 is a scan pulse supplied to the (j-1)-th gate line (FIG. 8).

As shown in FIGS. 13 and 14, the readout IC 80 includes an operational amplifier (op-amp) 82, a capacitor Cfb, a reset switch Sreset, a first switch S1, and a second switch S2. The op-amp 82 has an inverse terminal (−) connected to the j-th readout line ROLj and a non-inverse terminal (+) to which a reset voltage Vreset is applied. The capacitor Cfb is connected between an inverse input node Ni and an output node No of the op-amp 82. The reset switch Sreset is connected in parallel to the capacitor Cfb between the inverse input node Ni and the output node No of the op-amp 82. The first switch S1 is connected between the output node No and a first output line Lo1, and the second switch S2 is connected between the output node No and a second output line Lo2.

During period A when the reset switch Sreset is maintained in a turn-on state, the op-amp 82 serves as a buffer, and thus outputs the reset voltage Vreset supplied to the non-inverse terminal (+) to the output node No. During period B when the reset switch Sreset is inverted in a turn-off state, the reset voltage Vreset is stored in the capacitor Cfb. During period C when the first switch S1 is turned on, the reset voltage Vreset is output as a first output voltage Vo1 through the first output line Lo1. In this case, the reset voltage Vreset may be set to be equal to an initial value.

During period D, the reset voltage Vreset is synchronized with the supply of a scan pulse SPj-1, and the first node voltage VN1 of the touch sensor circuit P2 is stored in the capacitor Cfb through the j-th readout line ROLj and the inverse input node Ni. During period E when the second switch S2 is turned on, the first node voltage VN1 is output as a second output voltage Vo2 through a second output line Lo2. The second output voltage Vo2 depends on the first node voltage VN1 and changes depending on a level of the driving voltage Vdrv supplied to the touch sensor circuit P2. In other words, when the driving voltage Vdrv is generated in the low potential state, the second output voltage Vo2 is output as an initial value equal to the first output voltage Vo1. On the other hand, when the driving voltage Vdrv is generated in the high potential state, the second output voltage Vo2 is output as a value different than the first output voltage Vo1 due to the light sensing operation of the touch sensor circuit P2.

In accordance with the exemplary embodiment of the present invention, the first and second output voltages Vo1 and Vo2 are compared, a difference between the first and second output voltages Vo1 and Vo2 are calculated, the voltage difference is converted into a digital signal using an analog-to-digital converter (not shown), and the digital signal is supplied to the system (not shown). The system applies the digital signal to the touch algorithm, performs the touch recognition process and the coordinate calculation, and indicates the area of touch on the liquid crystal display panel 10. Hence, the liquid crystal display according to the exemplary embodiment of the invention can accurately sense a currently touched position and can be applied to various applications.

As described above, the liquid crystal display and the method of driving the same according to the exemplary embodiments of the invention can accurately sense whether or not the user touches the upper polarizing plate with his or her finger by detecting the changes in the amount of surface charge of the transparent conductive layer. Based on the sensed touch or non-touch sensing signal, the touch sensor circuits are driven only when the user touches the upper polarizing plate. Hence, the degradation of the sensor TFTs can be reduced, and the life span and reliability of the touch sensor circuits can be improved.

Furthermore, because the liquid crystal display and the method of driving the same according to the exemplary embodiments of the invention alternately drives the touch sensor circuits on the odd-numbered pixel lines and the touch sensor circuit on the even-numbered pixel lines only when the user touches the upper polarizing plate with his finger, the degradation of the sensor TFT can be reduced, and the life span and reliability of the touch sensor circuits can be improved.

It will be apparent to those skilled in the art that various modifications and variations can be made in the liquid crystal display of the present invention and the method of driving the same without departing from the spirit or scope of the invention. Thus, it is intended that the present invention cover the modifications and variations of this invention provided they come within the scope of the appended claims and their equivalents.

What is claimed is:

1. A liquid crystal display comprising:
   a liquid crystal display panel including a plurality of pixels each having a touch sensor circuit;
   a transparent conductive layer on an first substrate of the liquid crystal display panel transmitting display light;
   an insulating layer on the transparent conductive layer;
   a sensing circuit to generate a touch or non-touch sensing signal based on changes in the amount of surface charge of the transparent conductive layer depending on whether or not the insulating layer is touched;
   a driving voltage supply circuit to change the level of a driving voltage required to drive the touch sensor circuit inside the pixel depending on the touch or non-touch sensing signal;
   a readout IC to convert a light sensing signal received from a plurality of readout lines into a digital signal; and
   a system to perform a touch algorithm based on the digital signal,
   wherein the driving voltage of a high potential for a light sensing operation of the touch sensor circuit is generated only when the touch or non-touch sensing signal indicates that the insulating layer is touched, and
   wherein the touch sensor circuit includes a sensor TFT to generate a light current only when the driving voltage has the high potential, a sensor capacitor to store charges generated by the light current, and a switch TFT to supply the charges stored in the sensor capacitor to the readout lines as the light sensing signal.

2. The liquid crystal display of claim 1, wherein insulating layer is a polarizing plate.

3. The liquid crystal display of claim 1, wherein the sensing circuit includes:
   a charge amount sensing unit to sense the amount of surface charge of the transparent conductive layer;
   a first converting unit to convert the sensed amount of surface charge into an analog voltage value;
   an second converting unit to convert the analog voltage value into a digital voltage value; and
   a touch or non-touch sensing signal generation unit to generate the touch or non-touch sensing signal based on the digital voltage value.

4. The liquid crystal display of claim 3, wherein the touch or non-touch sensing signal is generated as a touch signal with a first level when the insulating layer is touched, and the touch or non-touch sensing signal is generated as a non-touch signal with a second level when the insulating layer is not touched.

5. The liquid crystal display of claim 4, wherein the driving voltage supply circuit includes a level shifter to shift the level of a touch or non-touch sensing signal swing between the first level and the second level into a driving voltage level in conformity with a drive of the touch sensor circuit, wherein the driving voltage is generated as a high potential in response to the touch signal with the first level and is generated as a low potential in response to the non-touch signal with the second level.

6. The liquid crystal display of claim 4, wherein the driving voltage supply circuit includes a level shifter to shift the level of a touch or non-touch sensing signal swing between the first level and the second level into a driving voltage level in conformity with a drive of the touch sensor circuit, wherein the driving voltage includes
   a first driving voltage that is generated as a high potential during a first half period of the touch signal and is generated as a low potential during a second half period of the touch signal and during the generation of the non-touch signal, and
   a second driving voltage that is generated as a high potential during the second half period of the touch signal and is generated as a low potential during the first half period of the touch signal and during the generation of the non-touch signal.

7. The liquid crystal display of claim 6, wherein the driving voltage supply circuit commonly supplies the first driving voltage to the touch sensor circuits on odd-numbered pixel lines and commonly supplies the second driving voltage to the touch sensor circuits on even-numbered pixel lines.

8. The liquid crystal display of claim 1, wherein the driving voltage supply circuit commonly supplies the driving voltage to the touch sensor circuits.

9. A method of driving a liquid crystal display including a liquid crystal display panel including a plurality of pixels each having a touch sensor circuit, a transparent conductive layer on a first substrate of the liquid crystal display panel transmitting display light, an insulating layer on the transparent conductive layer, a readout IC to convert a light sensing signal received from a plurality of readout lines into a digital signal, and a system to perform a touch algorithm based on the digital signal, the method comprising:
   generating a touch or non-touch sensing signal based on an amount of surface charge of the transparent conductive layer depending on whether or not the polarizing plate is touched; and
   changing the level of a driving voltage required to drive the touch sensor circuit inside the pixel depending on the touch or non-touch sensing signal;
   wherein the driving voltage of a high potential for a light sensing operation of the touch sensor circuit is generated only when the touch or non-touch sensing signal indicates that the insulating layer is touched, and
   wherein the touch sensor circuit includes a sensor TFT to generate a light current only when the driving voltage has the high potential, a sensor capacitor to store charges generated by the light current, and a switch TFT to supply the charges stored in the sensor capacitor to the readout lines as the light sensing signal.

10. The method of claim 9, wherein the insulating layer is a polarizing plate.

11. The method of claim 9, wherein generating the touch or non-touch sensing signal includes
    sensing the amount of surface charge of the transparent conductive layer,
    converting the sensed amount of surface charge into an analog voltage value,
    converting the analog voltage value into a digital voltage value, and
    generating the touch or non-touch sensing signal based on the digital voltage value.

12. The method of claim 11, wherein the touch or non-touch sensing signal is generated as a touch signal with a first level when the polarizing plate is touched, and the touch or non-touch sensing signal is generated as a non-touch signal with a second level when the polarizing plate is not touched.

13. The method of claim 12, wherein generating the driving voltage includes
    level-shifting a touch or non-touch sensing signal swing between the first level and the second level into a driving voltage level in conformity with a drive of the touch sensor circuit, and
    generating the driving voltage of a high potential in response to the touch signal with the first level and generating the driving voltage of a low potential in response to the non-touch signal with the second level.

14. The method of claim 12, wherein generating the driving voltage includes level-shifting a touch or non-touch sensing signal swing between the first level and the second level into a driving voltage level in conformity with a drive of the touch sensor circuit, and wherein the driving voltage includes a first driving voltage that is generated as a high potential during a first half period of the touch signal and is generated as a low potential during a second half period of the touch signal and during the generation of the non-touch signal, and a second driving voltage that is generated as a high potential during the second half period of the touch signal and is generated as a low potential during the first half period of the touch signal and during the generation of the non-touch signal.

15. The method of claim 14, wherein the first driving voltage is commonly supplied to the touch sensor circuits on odd-numbered pixel lines, and the second driving voltage is commonly supplied to the touch sensor circuits on even-numbered pixel lines.

16. The method of claim 9, wherein the driving voltage is commonly supplied to the touch sensor circuits.

* * * * *